(No Model.)
W. COLE.
SUPPORT FOR ELLIPTIC SPRINGS.
No. 373,516. Patented Nov. 22, 1887.
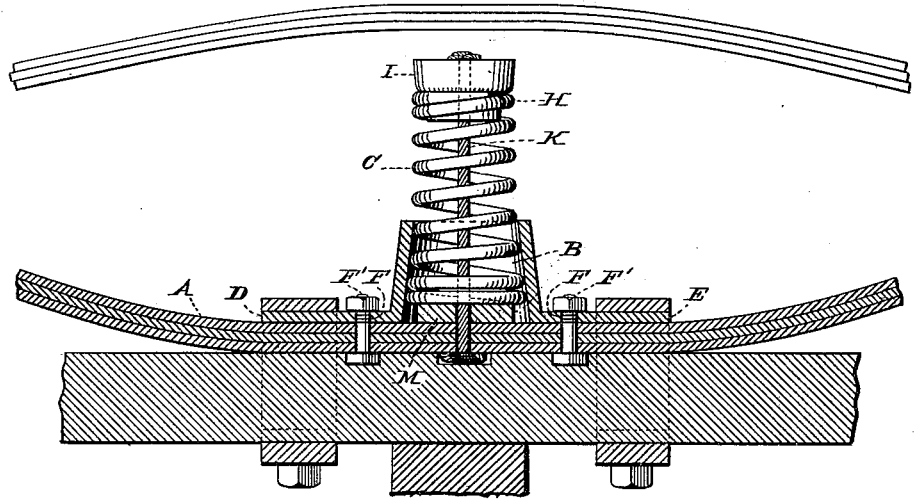
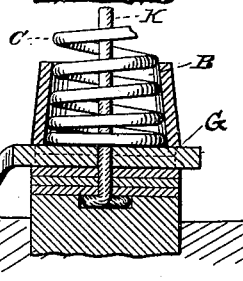
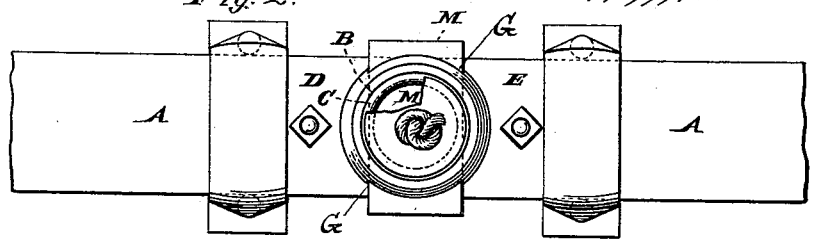
WITNESSES
Phil B. Masi.
Theo. Mungen.
INVENTOR
Wesley Cole,
by Anderson & Smith
Attorneys

UNITED STATES PATENT OFFICE.

WESLEY COLE, OF DETROIT, MICHIGAN, ASSIGNOR TO H. R. VANDERCOOK AND F. N. TUCKER, BOTH OF CHICAGO, ILLINOIS.

SUPPORT FOR ELLIPTIC SPRINGS.

SPECIFICATION forming part of Letters Patent No. 373,516, dated November 22, 1887.

Application filed February 26, 1887. Serial No. 229,065. (No model.)

*To all whom it may concern:*

Be it known that I, WESLEY COLE, a citizen of the United States, and a resident of Detroit, in the county of Wayne and State of Michigan, have invented a certain new and useful Improvement in Supporters for Elliptical Springs, designed to take the place of Rubber Bumpers; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention, and is a vertical section. Fig. 2 is a top view. Fig. 3 is a detail and a vertical section taken across the springs.

My invention relates to vehicle-spring supporters; and it consists in the construction and novel combination of parts, as hereinafter described and claimed.

The object of my invention is to provide a spring-supporting device which is designed to supersede the rubber bumper commonly used with elliptical vehicle-springs to relieve the springs of the jar that is imparted to them in traveling over rough or uneven roads.

In the drawings I have illustrated the spring-supporter as attached to the lower half of the elliptical spring. This disposition of the supporter is not absolutely essential to insure its successful operation, as I may and do invert the spring-supporter and secure it to the upper half of the elliptical spring to accomplish a like result to that secured by connecting the spring-supporter with the lower half of the elliptical spring.

Referring by letter to the accompanying drawings, A designates one of the elliptical springs employed to support the vehicle-body upon the running-gear of the vehicle.

B designates an annular open seat for one end of the spiral spring C. The seat B is made integral with the oppositely-extended horizontal arms D E, which are provided with bolt-holes F F, through which bolts F' are passed into and through the spring A to secure the spring-seat B to the elliptical spring A. The annular open seat B is recessed or cut away, as at G, to receive a brace.

C designates a helical coil or spiral spring. In the normally-free end H of the coil-spring C, I provide a rubber block or plug, I, which is held in its seat and connected with the elliptical spring by a wire cord, K, one end of which is passed axially through the rubber plug I and tied upon itself, the other end of said wire cord K being passed through a hole in the middle of that half of the elliptical spring to which it is desired to attach it, and then twisted upon itself to secure it in place. The rubber plug I assists in taking off the jar, and the wire cord serves to hold the rubber plug I in its place, and also takes the place of one of the bolts that holds the leaves of the spring together.

I may, and sometimes do, use the spring-supporter without the wire cord and rubber plug; but I prefer to use them in most instances.

Instead of using bolts to secure the supporter to the vehicle-spring, I sometimes use clips. The mode of attachment then is to loosen the nuts that secure the clips in place and slip the arms of the socket under said clips and again tighten the nuts.

With the spring-supporter I use a brace, M, which is attached at one end, by bolts or in any other suitable manner, to the reach of the running-gear, and extends horizontally through the socket B, beneath the lower enlarged end of the spring C. The width of the end of the brace M is such as to fill the cut-away space G in the base of the socket or seat B. The bottom of the seat or socket is larger in diameter than the top, and the spring is enlarged at its end to fit the enlargement of the socket or seat, so that when crowded into the seat by tightening up the clips the spring will be prevented from rattling.

Having described this invention, what I claim, and desire to secure by Letters Patent, is—

1. The combination, with an elliptical spring, of the open socket or seat provided with arms secured to the elliptical spring, the spiral spring seated in the open socket, and the brace connecting the socket to the reach of the running-gear, substantially as specified.

2. The combination, with an elliptical spring, of an open upwardly-tapered socket provided with wings secured to the lower half of said spring, this spring and socket rigidly secured to an axle, the brace M, recessed into the base of the said socket and secured to the reach, a spiral spring fitted into said socket and provided with a cushion on its upper end, and a guide-rod passed through the lower half of the elliptic spring, through the brace M, through the spiral spring, and secured to the said cushion, all substantially as described.

In testimony whereof I affix my signature in presence of two witnesses.

WESLEY COLE.

Witnesses:
    JAMES L. CAMMERS,
    LEE P. WATSON.